United States Patent [19]

Ochiai

[11] Patent Number: 5,196,076
[45] Date of Patent: Mar. 23, 1993

[54] RADIAL TIRE CARCASS PROFILE

[75] Inventor: Kiyoshi Ochiai, Kobe, Japan

[73] Assignee: Sumitomo Rubber Industries, Ltd., Japan

[21] Appl. No.: 533,452

[22] Filed: Jun. 5, 1990

Related U.S. Application Data

[63] Continuation-in-part of Ser. No. 185,273, Apr. 18, 1988, Pat. No. 4,955,416, which is a continuation-in-part of Ser. No. 835,783, Mar. 3, 1986, abandoned.

[30] Foreign Application Priority Data

Jun. 6, 1989 [JP] Japan ..................................... 1-43795
Jun. 6, 1989 [JP] Japan ..................................... 1-143796

[51] Int. Cl.$^5$ ............................................. B60C 3/04
[52] U.S. Cl. ................................. 152/454; 152/209 R; 152/538
[58] Field of Search ................... 152/454, 209 R, 538, 152/548

[56] References Cited

U.S. PATENT DOCUMENTS

4,343,341  8/1982  Jackson .............................. 152/454
4,884,610  12/1989  Saito .................................. 152/454
4,955,416  9/1990  Takeuchi et al. ..................... 152/454

OTHER PUBLICATIONS

Treading Design Guide, vol. 13, 1978, pp. 101-103.

*Primary Examiner*—Geoffrey L. Knable
*Attorney, Agent, or Firm*—Stevens, Davis, Miller & Mosher

[57] ABSTRACT

A radial tire, of which initial carcass profile in an unused tire state is maintained through the tire life to prevent tire performances improved by arranging the carcass profile from being deteriorated, and in which the ratio (R1/R1(5)) of the radius (R1) of curvature of the carcass profile in an upper sidewall region when the tire is mounted on the regular rim and inflated to the normal pressure to the radius (R(5)) of curvature of the carcass profile in an upper sidewall region when the tire is mounted on the regular rim and inflated to 5% of the normal pressur, is not less than 0.70 and not more than 0.95, the ratio (TR1/SW) of the radius (TR1) of curvature of the tread face to the maximum tire section width (SW) when the tire is mounted on the regular rim and inflated to the normal pressure, is not less than 1.28 and not more than 1.95, and at least one of ratios (R1/R2) and (R1/Hg) satisfy the following conditions:

the ratio (R1/R2) of the radius (R1) of the upper region to the radius (R2) of the lower region when the tire is mounted on the regular rim and inflated to the normal pressure, is not less than 0.95 and not more than 1.08, the ratio (R1/Hg) of the radius (R1) of the upper region to the radial distance (Hg) between the maximum tire section width point (b) and the center point (g) on the tire equator, when the tire is mounted on the regular rim and inflated to the normal pressure, is not less than 0.90 and not more than 1.05.

4 Claims, 4 Drawing Sheets

RADIAL TIRE CARCASS PROFILE

This application is a continuation-in-part of application Ser. No. 185,273, filed Apr. 18, 1988, now U.S. Pat. No. 4,955,416, which is a continuation-in-part of application Ser. No. 835,783, filed Mar. 3, 1986, now abandoned.

The present invention relates to a radial tire, more particularly to an improvement in a carcass profile suitably applied to radial tires for heavy vehicles such as truck and bus.

In the radial tires, especially in heavy duty radial tires for truck and bus, an easy tire maintenance and a reduction in the tire expense in the total expense which relates to the length of the tire life, are required.

As to the tire maintenance, to decrease the tire rotations by improving the resistance to wear, especially uneven wear is essential to the easy maintenance.

As to the tire life, to improve the tread wear life and tire durability is essential to prolongation of the total tire life so as to be able to increase the number of retreading.

In Japanese Patent Publication (KOKAI) No. 60-61305, there is disclosed a heavy duty radial tire in which a carcass is formed in a different profile from its naturally balanced profile to decrease the rolling resistance and to maintain the wet performances at the same time.

In U.S. patent application Ser. No. 835,783, the present inventor proposed a pneumatic tire in which the carcass profile is decreased in the radius of curvature at shoulder regions when the tire is inflated to the normal pressure therefor from 5% pressure thereof, and thereby various tire performances; cut resistance, wear resistance, high speed durability, fuel consumption, steering stability and the like are improved in a well balance without deteriorating ride comfort.

The present invention was made based on the tire proposed by U.S. patent application Ser. No. 835,783.

On the other hand, the inventor found that the carcass profile of the new tire or unused tire is different from the carcass profile of the used tire, that is, the tire structure such as the carcass, breaker (belt, band), rubber and the like is irreversibly deformed by running with heavy load and as a result the carcass profile is changed, and that the superior performances improved by the above-mentioned arranged carcass profile are therefore, deteriorated with the tire is used.

However, in the above-mentioned prior arts (Japanese KOKAI No. 60-61305 and U.S. patent application Ser. No. 835,783), such a change in a carcass profile from the designed profile in an unused new state caused by using the tire is left out of consideration, and it was found that it is very difficult for those prior proposals to maintain the improved superior performances for a long time or through the total tire life including a life extended by retreading the worn tire.

It is therefore, an object of the present invention to provide a radial tire, in which
the irreversible profile change from the specifically arranged carcass profile after the tire has been used for a long time is effectively reduced so as to maintain the initial tire performances improved by the arranged carcass profile through the tire life, and
the wear resistance and uneven wear resistance are further improved to achieve easy tire maintenance, and further the structural durability is further improved so as to endure being retreaded two or three or more times to prolong the total life of the tire, and furthermore the expense of the tire in the running cost is reduced.

The present invention is based the following findings that the carcass profile change can be reduced by
either setting the ratio ($R_1/R_2$) of the radius ($R_1$) of curvature of the profile at a tire sidewall upper region to the radius ($R_2$) at a lower region in a specific range
or setting the ratio ($R_1/H_g$) of the radius ($R_1$) of the upper region to the radial distance ($H_g$) between a maximum tire section width point (b) and the center point (g) on the tire equator in a specific range, and
that in the above-mentioned specific ranges for the ratios, by setting the ratio $TR_1/SW$ of the radius $TR_1$ of curvature of the tread face to the tire section width SW in a specific range, wear resistance, uneven wear resistance such as shoulder wear resistance, cut resistance can be further improved.

According to one aspect of the present invention, a radial tire comprises
a carcass having at least one ply of radially arranged cords,
a tread on the carcass provided on the outer face thereof with a curvature, and
a belt disposed between the carcass and the tread and having at least two plies of parallel cords inclined with respect to the circumferential direction of the tire,
the carcass profile comprises
an upper region provided with an outwardly swelling curvature at least 90% of which is formed by a circular arc having a radius ($R_1$) and
a lower region provided with an outwardly swelling curvature at least 90% of which is formed by a circular arc having a radius ($R_2$) where
the upper region extends between a maximum carcass section width point (b) corresponding to the maximum tire section width point (f) and a belt outer edge point (a) defined as an intersection of the carcass with a line ($K_e$) extending parallel to the tire equator from a edge (e) of the belt ply which is narrowest within three plies from the innermost ply, and
the lower region extends between the maximum carcass section width point (b) and an inflection point (c) at a height $H_2$ of 160% of the height $H_1$ of a flange of a regular rim,
the ratio ($R_1/R_1(5)$) of the radius ($R_1$) of the upper region when the tire is mounted on the regular rim and inflated to the normal pressure to the radius ($R_1(5)$) of the upper region when the tire is mounted on the regular rim and inflated to 5% of the normal pressure, is not less than 0.70 and not more than 0.95,
the ratio ($TR_1/SW$) of the radius ($TR_1$) of the curvature of the tread face to the maximum tire section width (SW) when the tire is mounted on the regular rim and inflated to the normal pressure, is not less than 1.28 and not more than 1.95, and
the ratio ($R_1/R_2$) of the radius ($R_1$) of the upper region to the radius ($R_2$) of the lower region, when the tire is mounted on the regular rim and inflated to a normal pressure, is not less than 0.95 and not more than 1.08.

According to another aspect of the present invention, a radial tire comprises
a carcass having at least one ply of radially arranged cords,
a tread on the carcass provided on the outer face thereof with a curvature, and a belt disposed between the carcass and the tread and having at least two plies of parallel cords inclined at small angles with respect to the circumferential direction of the tire, the carcass profile comprises an upper region provided with an outwardly swelling curvature at least 90% of which is formed by a circular arc having a single radius (R1) and a lower region provided with an outwardly swelling curvature at least 90% of which is formed by a circular arc having a single radius (R2) where the upper region extends between a maximum carcass section width point (b) corresponding to the maximum tire section width point (f) and a belt outer edge point (a) defined as an intersection of the carcass with a line (Ke) extending parallel to the tire equator from a edge (e) of the belt ply which is narrowest within three plies from the innermost ply, and the lower region extends radially inwardly from the maximum carcass section width point (b), the ratio (R1/R1(5)) of the radius (R1) of the upper region when the tire is mounted on the regular rim and inflated to the normal pressure to the radius (R1(5)) of the upper region when the tire is mounted on the regular rim and inflated to 5% of the normal pressure, is not less than 0.70 and not more than 0.95, the ratio (TR1/SW) of the radius (TR1) of the curvature of the tread face to the maximum tire section width (SW) when the tire is mounted on the regular rim and inflated to the normal pressure, is not less than 1.28 and not more than 1.95, and the ratio (R1/Hg) of the radius (R1) of the upper region to the radial distance (Hg) between the maximum tire section width point (b) and the center point (g) on the tire equator, when the tire is mounted on the regular rim and inflated to the normal pressure, is not less than 0.90 and not more than 1.05.

Function

For example, a truck/bus tire of size 10.00R20 14PR, which is a typical size of the heavy duty radial tires, is mounted on a normal rim of size 7.50V×20, and the tread width is about 180 to 200 mm, and the tread has a curved tread face.

In such a heavy duty radial tire, as shown in FIG. 4, it is ideal that the camber quantity z2 in a used state is substantially equal to the camber quantity z1 in an unused tire state, however, the tread face is changed with the used time becomes long, and there are two types of changes as follows: a rounding phenomenon wherein the radius TR2 of curvature of the used tire tread face T2 becomes smaller than the radius TR1 of curvature of the unused new tire tread face T1 as shown in FIG. 5; and a flattening phenomenon wherein the radius TR2 of curvature of the used tire tread face T2 becomes larger than the radius TR1 of curvature of the unused tire tread face T1 as shown in FIG. 6 (the unused tire tread face T1 by a solid line, the used tire tread face T2 by a broken line).

The above-mentioned camber quantity z is the radial distance between the tread face center x and the tread edge y, and is varied by the change in the tread face curvature.

When the rounding phenomenon is occurred as shown in FIG. 5, the camber quantity z2 in the used tire becomes larger than the camber quantity z1 in the unused tire.

Contrary, when the flattening phenomenon is occurred as shown in FIG. 6, the camber quantity z2 in the used tire becomes smaller than the camber quantity z1 in the unused tire.

It was confirmed that the change in the camber quantity closely relates to the carcass profile, and I made researches in carcass profile capable of decreasing the above-mentioned change in the camber quantity z. The results are shown in FIG. 2.

FIG. 2 shows a relationship between the ratio R1/R2 of the radius R1 of curvature of the profile in an upper region C1 to the radius R2 of curvature in a lower region C2, both in the tire sidewall portion and the change z2−z1 in the camber quantity before and after a 10,000 km running without wear under a normal condition that the test tire was inflated to 7.25 kg/sq.cm and loaded with normal load of 2700 kg. In FIG. 2 the sign in the change z2−z1 in the camber quantity has the following meanings. When the change z2−is + (plus), the tread face is rounded, and the change is − (minus), the tread face is flattened.

FIG. 2 clearly and unobviously shows that the change z2−z1 in the camber quantity can be decreased to substantially 0 (zero) by setting the above-mentioned radius ratio R1/R2 within the range of not less than 0.95 and not more than 1.08.

Further, FIG. 3 shows a relationship between the ratio R1/Hg of the radius R1 of the curvature of the upper region C1 to the radial distance Hg between the maximum section width point b and the central point g on the tire equatorial plane CS both on the carcass profile and the difference ($a2−a1$) between the percentage $a2(=100z2/TW2)$ of the camber quantity z2 to the tread width TW2 of the used tire and the percentage $a1(=100z1/TW1)$ of the camber quantity z1 to the tread width TW1 of the unused tire.

In the figure, the sign in the difference ($a2−a1$) has the following meansings. When the difference ($a2−a1$) is +(plus), the tread face is rounded, and the difference is −(minus), the tread face is flattened.

FIG. 3 also clearly and unobviously shows that the difference ($a2−a1$) can be decreased to substantially 0 (zero) by setting the above-mentioned ratio R1/Hg within the range of not less than 0.90 and not more than 1.05.

In FIG. 3, the ratio R1/R2 was 1.02 and in FIG. 2, the ratio R1/Hg was 1.0.

The ratio R1/R1(5) of the radius R1 of the upper region C1 in a normal pressure state to the radius R1(5) of the upper region C1(5) in the 5% pressure state is set to be not less than 0.70 and not more than 0.95, whereby the radius R1(5) becomes decreased R1 with increasing in the tire pressure, and the tread shoulder portions are moved radially outwardly to increase the radius of tread curvature.

As a result, compressive strain is generated in the tread crown portion, which strain increases the apparent bending rigidity of the tire tread portion and accordingly improves cut resistance and wear resistance of the tread portion and fuel consumption performance.

Further, wet grip, traction are improved, and lightening of the tire weight can be achieved by decreasing the thickness of the tread rubber.

In order to further improve wear resistance, uneven wear resistance, cut resistance and carcass durability by means of optimizing the ground pressure distribution, the ratio TR1/SW of the radius TR1 of curvature of the tread face of the unused tire in the normal pressure state to the maximum tire section width SW in the normal pressure state is set to be not less than 1.28 and not more than 1.95.

When the ratio TR1/SW is less than 1.28, the tread face is excessively curved, and the amount of tread wear becomes large in the crown portion. Further, the uneven wear resistance is deteriorated, and as the ground contacting pressure increases in the crown portion, the cut resistance is lowered.

When the ratio is more than 1.95, the ground contacting pressure increases and heat generation in the tread portion increases at the shoulder portions and tread durability is decreased.

To set the ratio R1/R2 and ratio R1/Hg in the above-mentioned ranges becomes a condition to maintain the above-mentioned improved performances owing to the increased tread rigidity by the carcass profile change.

The change in the carcass profile through the tire life from unused new state to worn and retreaded state is decreased by arranging the change in size of the various parts, especially, the change in the foot print of the tread.

To set the ratio R1/R2 in the above-mentioned range becomes a condition to maintain the above-mentioned improved performances owing to the ratio TR/SW.

To set the ratio R1/Hg in the above-mentioned ranges becomes a condition to maintain the above-mentioned improved performances owing to the radius TR of curvature of the unused new tire tread.

Thus, the various tire performances are maintained as same as those in the new state.

Such improvements increase high speed durability and lower the heat generation and accordingly increase the ability to be retreaded, which contributes an increase in the tire life and therefor a decrease in total running cost.

DEFINITION

As shown in FIG. 1, the above-mentioned upper region C1 is defined as a region extending between
the maximum carcass section width point b corresponding to the maximum tire section width point f and
the belt outer edge point (a) defined as an intersection of the carcass with a radial line Ke extending parallel to the tire equator CS from the axially outer edge e of a belt ply which is narrowest in the innermost first belt ply to the third belt ply, if there are more than two plies.

The lower region C2 is defined as a region extending between the above-mentioned maximum carcass section width point b and an inflection point c on the carcass which lies at height H2 of 160% of the rim flange height H1 of a regular rim 2.

The radius R1 of curvature is defined as the radius of the circular arc which substantially coincides with the curvature of the upper region C1 in at least 90% of the region.

The radius R2 of curvature is defined as the radius of the circular arc which substantially coincides with the curvature of the upper region C2 in at least 90% of the region. Here, "substantially coincide" means that the profile is included within a range of the radius (R1, R2)±0.5%.

The normal pressure state is that the tire is mounted on a regular rim 2 and inflated to the normal pressure, that is, the maximum pressure for the tire.

The 5% pressure state is that the tire is mounted on the regular rim 2 and inflated to 5% of the normal pressure. When the reference concerns this state, "(5)" is added immediately after that.

EMBODIMENT

An embodiment of the present invention will now be described in detail with reference to the drawings, in which FIG. 1 is a sectional view showing an embodiment of the present invention;

Figure 1:
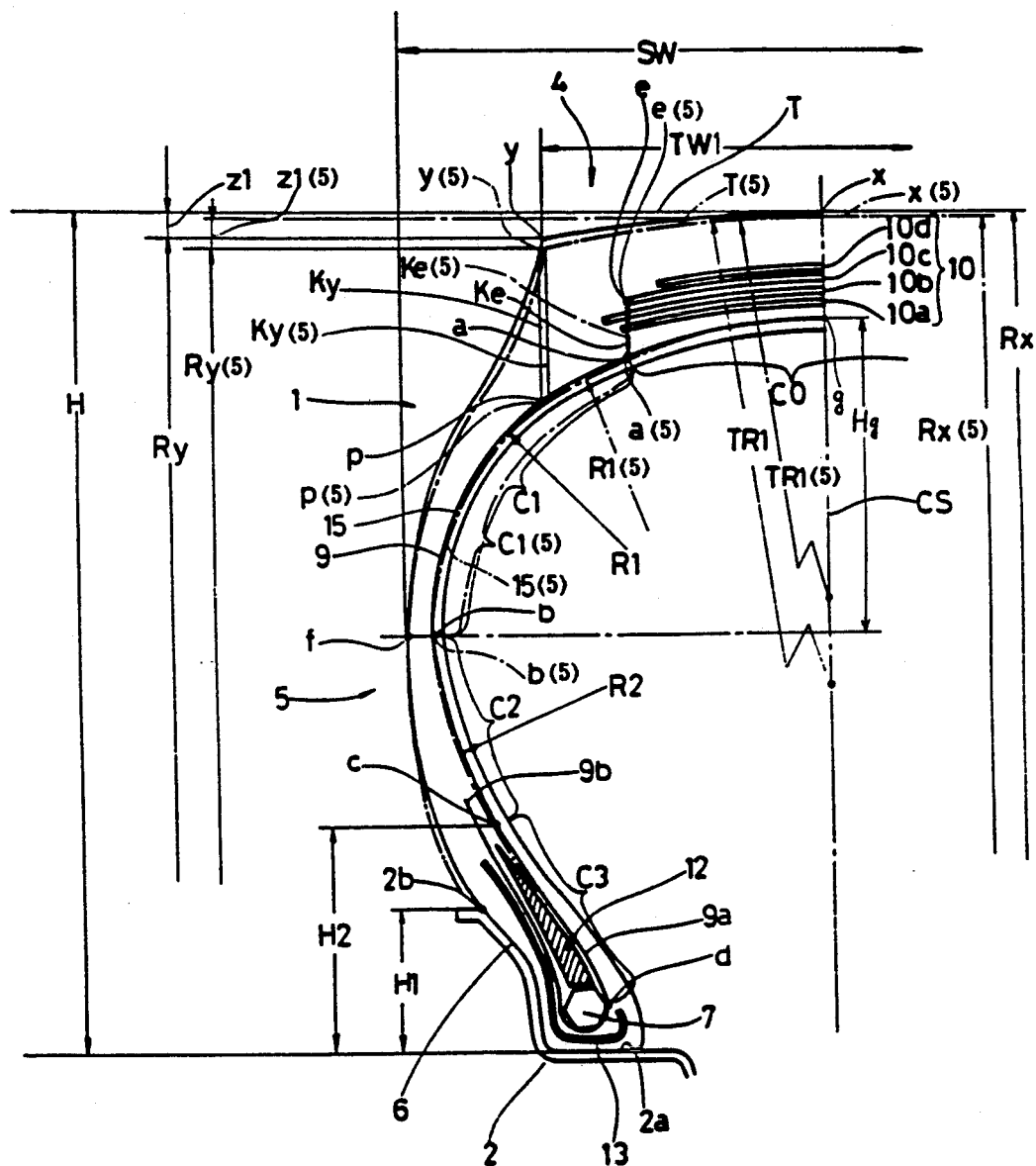

In FIG. 1, tire 1 according to the present invention is a heavy duty radial tire of size 10.00R20 14PR, and is mounted on a regular rim of size 7.50VX20, and the unused new tire without tire load is depicted
by solid line to show its normal pressure state in which the tire is inflated to the normal pressure, in this example 7.25 kgf/sq.cm and
by chain line to show its 5% pressure state in which the tire is inflated to 5% of the normal pressure.

The radial tire 1 comprises
a pair of bead cores 7 disposed one in each bead portions 6, a carcass 9 extending between the bead portions through a tread portion 4 and sidewall portion 5 and turned up around the bead cores,
a belt layer 10 disposed radially outside the carcass and radially inside a rubber tread,
a bead apex 12 disposed between the main portion 9a and each of the turned up portion 9b of the carcass.

The bead apex extends radially outwardly and taperingly from the bead core, and is composed of a single hard rubber layer or two layers of a hard rubber and a soft rubber.

To reinforce the bead portion or to increase the bead rigidity, each bead portion is provided with a metal cord reinforcing layer 13, but various kinds of known reinforcement layers, such as an organic fiber cord reinforcing layer, a rim chafer and the like can be used aside from the above-mentioned metal cord reinforcing layer 13.

The carcass 9 has at least one ply of nonextensible or low extensible cords laid at angles of 70 to 90 degrees to the tire equator. In this embodiment, the carcass composed of one ply of steel cords (7×/0.175 mm) embedded in rubber.

The carcass profile is generally defined by a center line of the thickness of the carcass, and the carcass profile 15 in the normal pressure state and the carcass profile 15(5) in the 5% pressure state are shown in FIG. 1 by solid line and chain line, respectively.

The belt layer 10 is composed of plural plies of cords, for example 4 plies, the radially innermost first ply 10a to the outermost forth ply 10d.

The cords of each of the belt plies 10a–10d are of nonextensible like a steel cord or of low extensible like an aramid cord, in this embodiment, steel cords (1+3/0.20+1×6/0.38 mm) are used.

The maximum width of the belt layer, that is, the width of the widest belt ply in the belt plies 10a-10d is preferably 80 to 95% of the tread width TW1 to reinforce a wide range of the tread portion.

In at least 2 plies of the belt plies 10a-10d, in this embodiment 3 plies 10b, 10c and 10d, the cords of each ply are arranged at relatively small angles 10 to 25 degrees to the tire circumferential direction, in this embodiment at 16 degrees. Further, the cords of one of the remaining ply or plies, in this embodiment the cords of the innermost ply 10a are arranged at angles of 40 to 70 degrees, for example 67 degrees, whereby the belt ply cords and the carcass cords make up a stiff triangular structure to increase the bending rigidity of the tread portion.

The carcass profile 15 comprises a belt region C0, upper regions C1, lower regions C2 and bead regions C3, as follows.

The belt region C0 is defined as a region beneath the belt layer 10 extending from the center g on the tire equatorial plane CS to points (a) one on each side thereof, where the point (a) is the intersection of a perpendicular Ke (passing through the axially outer edge e of the narrowest width belt ply in the innermost first belt ply 10a to the third belt ply 10c, in this embodiment, the edge of the third belt ply 10c) with the carcass profile 15.

Between the points (a), there are at least three plies 10a-10c to provide a large rigidity.

Due to hoop effect by the belt layer and increased rigidity by the above-mentioned triangular cord structure, the belt region C0 is stable and is hardly deformed by tire inflation.

The upper region C1 is defined as a region between the above-mentioned point (a) and a maximum width point b corresponding to the maximum tire section width position f.

The bead region C3 is defined as a region between the point d at which the carcass main portion portion 9a substantially contacts with the bead core 7 and a point c at a height H2 from the bead base or the bead seat 2a of the rim 2, where the height H2 is 160% of the height H1 of the rim flange 2b from the bead seat 2a of the rim 2.

The bead region C3 has a curvature swelling inwardly of the tire. The bead region C3 is located in the rigid tire bead portion reinforced by the bead reinforcements such as the above-mentioned bead apex 12 and the reinforcing layer 13.

The lower region C2 is defined as a region between the the above-mentioned maximum width point b and the above-mentioned point c.

The regions C1 and C2 each have curvatures swelling outwardly of the tire and smoothly connected to each other at the point b.

The inflection point between the regions C2 and C3 is positioned at or near the the above-mentioned point c, and the curvatures of the regions C2 and C3 are smoothly connected at the inflection point.

The regions C1 and C2 have a smaller rigidity in contrast with the regions C0 and C3, and accordingly have a less resistance to deformation, therefore the carcass profile may be changed in the regions C1 and C2 when inflated and loaded, but such a profile change can be easily controlled by means of arranging the profile and rigidity in the regions C0 and C3, the total length of the carcass (profile 15) between the points d and d,
the thickness distribution of the rubber on the carcass, the mold width between the beads (the bead clip ring width of a vulcanizing mold) and the like, which are known in the art.

Based on the above-mentioned radius R1 of curvature of the upper region C1 in the normal pressure state,
the radius R1(5) of curvature of the upper region C1(5) in the 5% pressure state is set so that
the ratio R1/R1(5) is not less than 0.70 and not more than 0.95 and
the radius of curvature of the upper region decreases with increase in the tire pressure to move tread shoulder portions radially outwardly.

By the radially outward movement, the tread face is flattened and the radius TR of curvature of the tread face T in the normal pressure state is increased more than the radius TR(5) of curvature of the tread face T(5) in the 5% pressure state, thereby generating compressive strain in the tread rubber and increasing the apparent bending rigidity of the tread.

Further, substantially not to allow the central part of the tread face to be moved radially outwardly with increase in the tire pressure,
the ratio Rx/Rx(5) of the radius Rx of the tread face T in the normal pressure state measured at the center x thereof from the tire axis to
the radius Rx(5) of the tread face T(5) in the 5% pressure state measured at the center x(5) thereof from the tire axis is set to be not less than 1.0 and not more than 1.05, and more preferably not less than 1.0 and not more than 1.003.

And, to allow the tread edge to be moved radially outwardly by a larger amount than that in the tread center,
the ratio Ry/Ry(5) of the radius Ry of the tread face T measured at the edge y thereof from the tire axis to
the radius Ry(5) of the tread face T(5) measured at the edge y(5) thereof from the tire axis
must be larger than the above-mentioned ratio Rx/Rx(5).

Accordingly, the camber quantity z1(5) in the 5% pressure state is larger than the camber quantity z1 in the normal pressure state.

For that, the carcass profile is designed such that the above-mentioned upper region C1(5) of the carcass profile 15(5) in the 5% pressure state is located radially inward of that in the normal pressure state, and
a point p at which a perpendicular Ky passing through the tread edge y intersects with the carcass profile 15 is positioned radially and axially outside
a point p(5) at which a perpendicular Ky(5) passing through the tread edge y(5) intersects with the carcass profile 15(5).

Figure 2:
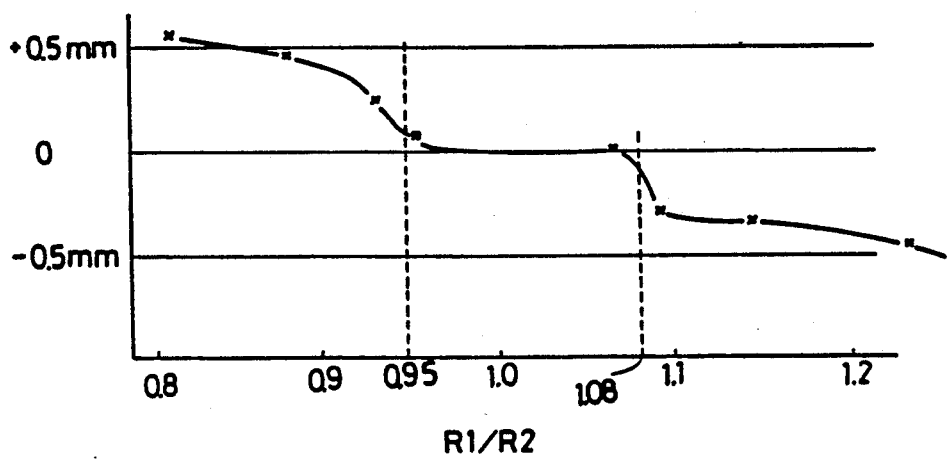
FIG. 2 is a diagram showing the relationship between the change $z_2 - z_1$ in camber quantity and the ratio R1/R2.

In order to maintain the above-explained improved performances through the tire life, the ratio R1/R2 of the radius R1 of curvature of the upper region C1 to the radius R2 of curvature of the lower region C2 is set to be not less than 0.95 and not more than 1.08, whereby as shown in FIG. 2, the change $z2-z1$ of the camber quantity $z2$ of the used tire 1 from the camber quantity $z1$ of the unused new tire 1, that is, the used distortion in the tread profile is reduced and also deformation of the carcass profile is reduced. Therefore, the improved performances of the new tire can be obtained even in the used tire.

Figure 3:
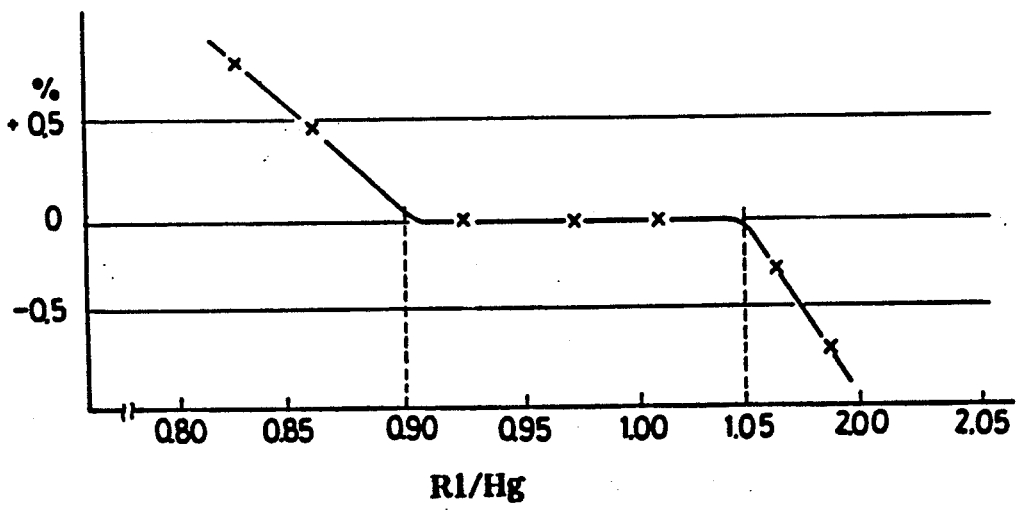
FIG. 3 is a diagram showing the relationship between the difference $\alpha_2 - \alpha_1$ and the ratio R1/Hg.
Figure 4:
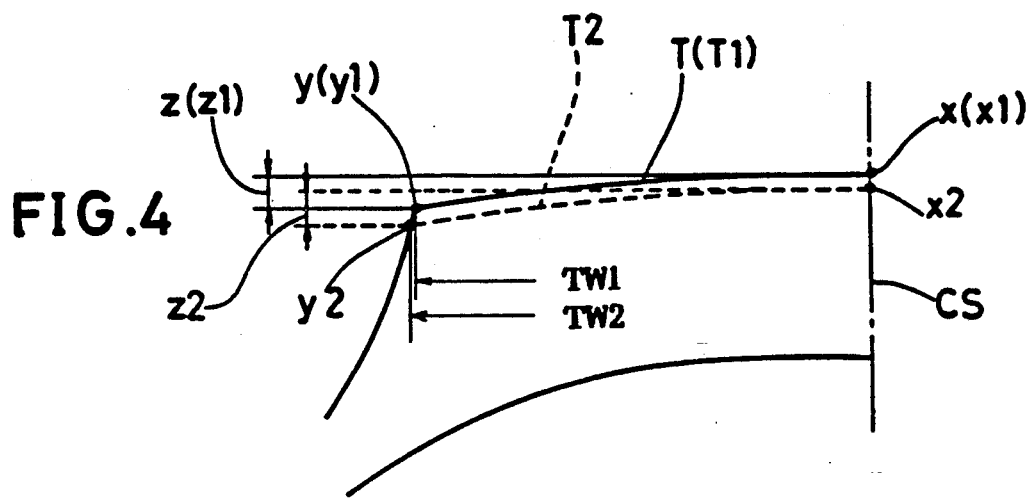
FIG. 4 is a sectional view showing a tread profile change of the embodiment.
Figure 5:
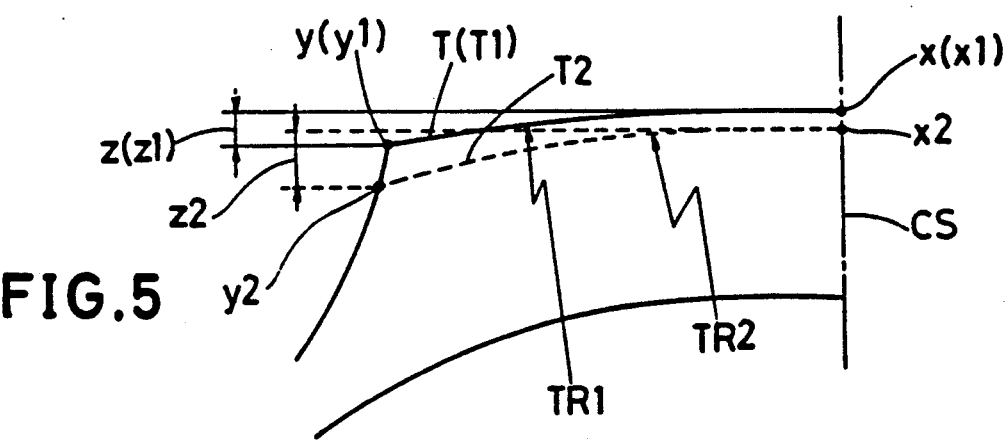
FIGS. 5 and 6 are sectional views showing tread profile changes in the prior art tires.
Figure 6:
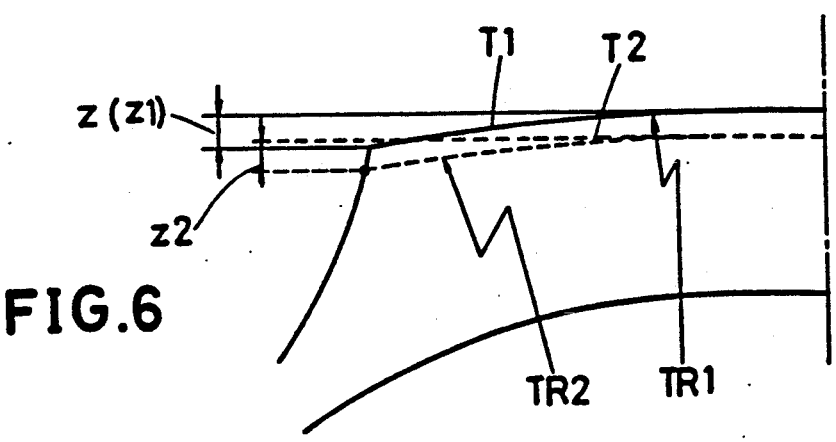

Further, the ratio R1/Hg of the above-mentioned radius R1 to the height Hg is set to be not less than 0.90 and not more than 1.05, whereby as shown in FIG. 3, the above-mentioned difference ($\alpha 2 - \alpha 1$) is decreased.

Figure 7:
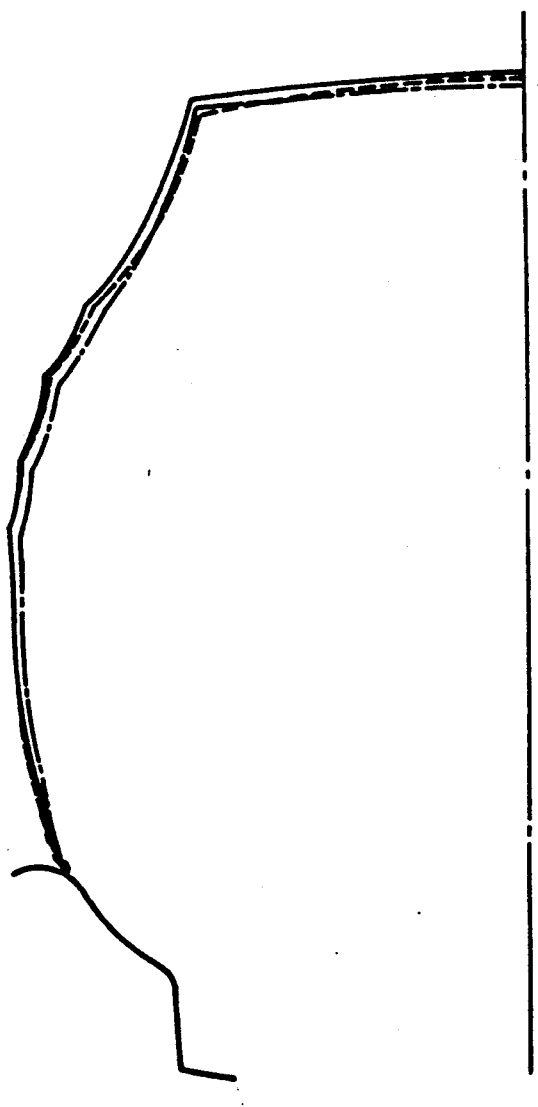
FIG. 7 shows the change in the profile of the embodiment tire when inflated to the normal pressure from 5% pressure thereof.

FIG. 7 shows the change in the profile of the tire 1 when inflated to the normal pressure from 5% pressure thereof, wherein the profile in the normal pressure state is shown by solid line, and that at 5% is shown by broken line.

As apparent from the figure, the tire profile was moved in a range from a point at about 60% of the tire section height H to a point in the tread shoulder.

In FIG. 7, the chain line shows the profile of a prior art tire of which profile moves in the almost whole range. Incidentally, those tire profiles were copied by using plaster.

Due to such a profile change, the tension of the carcass cords can be increased in the changed range, and the apparent rigidity thereof is increased, whereby the cornering power is increased to improve the steering stability, and further movements of the tread elements such as ribs, blocks and the like during running are reduced to decrease the tire rolling resistance and also to improve wear resistance, cut resistance without sacrificing wet grip and high speed durability.

Comparison Tests

Test tires of size 10.00R20 having a structure shown in FIG. 1 and specifications given in Table 1 were made and tested for high speed durability, cut resistance, shoulder wear resistance, heat generation, wear resistance and retread durability. The test results are also given in Table 1, wherein the test results are indicated by index based on the assumption that the reference tire is 100. The larger the value, the better the result. The values in parenthesises show passing marks for the respective performances.

The carcass of each test tire was composed of one ply of steel cords (7×4/0.175 mm) arranged at 90 degrees to the tire equator.

The belt layer of each test tire was composed of 4 plies of steel cords (1+3/0.20+1×6/0.38 mm), wherein
the cord angle of the innermost ply 10a was 67 degrees and the cord angles of the other plies 10b–10d were 16 degrees, each to the tire equator, and further
the cords of the ply 10a were inclined toward the same direction as the cords of the ply 10d, and
the cords of the ply 10c were inclined toward the same direction as the cords of the ply 10d, but opposite to the plies 10a and 10b.

The radii R1, R2 and TR1 were measured under a condition that the tire was mounted on a regular rim of size 7.50V×20 and inflated to 7.25 kg/sq.cm without tire load.

The radius TR2 was measured after the tire had run on a 1.6 m diameter test drum for 10000 km at 50 km/h with 2700 kg tire load.

In the high speed durability test, increasing the running speed by 10 km/h steps every two hours from the initial speed of 80 km/h, the test tire inflated to the normal pressure and loaded with 140% of the load specified in JIS was run on a test drum, and the total running distance to tire failure was measured as its durability.

The working example tires could have even ground pressure distribution and less deflection and as a result the high speed durability thereof was improved.

The wear resistance tests were made as field tests, where the test tires were run for 80,000 km (on expressway at 70% and normal paved road at 30%).

The depths of the remaining tread grooves were measured at the crown portion and the shoulder portion to obtain the amount of wear.

The shoulder wear resistance was evaluated from the difference between the wear amount at the crown portion and that at the shoulder portion.

The total wear resistance was evaluated from the average of the wear amount at the crown portion and that at the shoulder portion.

In the cut resistance test, the depth of cut formed on the tread rubber when a 10 mm width edge tool the tip of which sharpness of 0.5 R and a taper angle of 25 degrees had been pressed was measured.

In the heat generation test, the tire was run on a test drum at 80 km/h with a tire load specified in JIS, and after the temperature was balanced, the temperature of the tread rubber near the belt edge was measured.

The working example tires could maintain an evened ground pressure distribution and a good shape in the foot print, and were improved in the cut resistance and heat generation.

In the retread durability test, the new test tire was run until the tread wear reached to its limit line, and then the worn tire was retreaded by using a precured tread rubber, that is, by the so called precure retreading method, and again the retreaded tire was run until the tread wear reached to its limit line, and the total running distance of the new tire and the retreaded tire was computed as the retread durability. It was confirmed that the working example tires were superior to the reference tires.

As described above, in the radial tires according to the present invention, since the carcass profile distortion after the use, that is, the carcass profile change between a new state and a used state of the tire is effectively decreased, various tire performances such as steering stability, cut resistance, wet grip performance, handling performance, ride comfort, fuel consumption performance and the like are improved or maintained through the tire life including retreaded life, and at the same time, the wear resistances are improved to prevent the tread from uneven wear, which contributes to the improvement in the easy maintenance performance, and also the durability of the tire against retreading is improved, which contributes to the prolongation in the total tire life. Therefore, total running cost can be decreased.

TABLE

|  |  | Ex. 1 | Ex. 2 | Ex. 3 | Ex. 4 | Ref. 1 | Ref. 2 | Ref. 3 | Ref. 4 | Ref. 5 | Ref. 6 | Ref. 7 |
| --- | --- | --- | --- | --- | --- | --- | --- | --- | --- | --- | --- | --- |
| R1 | (mm) | 96.9 | 110.2 | 96.9 | 110.2 | 96.5 | 111.2 | 111.2 | 96.9 | 96.9 | 110.2 | 110.2 |
| R1(5) | (mm) | 138.4 | 116.0 | 121.1 | 116.0 | 137.9 | 117.0 | 115.8 | 142.5 | 142.5 | 114.8 | 114.8 |
| R1/R1(5) |  | 0.70 | 0.95 | 0.80 | 0.95 | 0.70 | 0.95 | 0.96 | 0.68 | 0.68 | 0.96 | 0.96 |
| Hg | (mm) | 107.7 | 104.9 | 96.9 | 112.4 | 108.4 | 104.9 | 103.9 | 96.9 | 96.9 | 110.2 | 110.2 |
| R1/Hg |  | 0.90 | 1.05 | 1.00 | 0.98 | 0.89 | 1.06 | 1.07 | 1.00 | 1.00 | 1.00 | 1.00 |
| R1/R2 |  | 0.95 | 0.95 | 1.08 | 1.08 | 0.95 | 1.08 | 1.08 | 0.95 | 0.95 | 0.95 | 0.95 |
| TR1 | (mm) | 480 | 560 | 560 | 480 | 560 | 470 | 480 | 570 | 565 | 565 | 475 |

TABLE-continued

|  | Ex. 1 | Ex. 2 | Ex. 3 | Ex. 4 | Ref. 1 | Ref. 2 | Ref. 3 | Ref. 4 | Ref. 5 | Ref. 6 | Ref. 7 |
| --- | --- | --- | --- | --- | --- | --- | --- | --- | --- | --- | --- |
| TR1(5) (mm) | 480 | 560 | 560 | 485 | 530 | 510 | 520 | 565 | 570 | 560 | 470 |
| High speed durability (more than 100) | 110 | 105 | 108 | 115 | 100 | 105 | 105 | 85 | 85 | 105 | 110 |
| Cut resistance (more than 105) | 105 | 108 | 105 | 105 | 100 | 105 | 90 | 105 | 105 | 95 | 90 |
| Heat resistance (more than 100) | 110 | 105 | 108 | 115 | 100 | 85 | 105 | 85 | 85 | 105 | 110 |
| Shoulder wear resistance (more than 105) | 105 | 110 | 115 | 110 | 100 | 100 | 100 | 105 | 105 | 95 | 90 |
| Wear resistance (more than 105) | 105 | 105 | 105 | 105 | 100 | 100 | 100 | 110 | 108 | 95 | 90 |
| Retreading durability (more than 105) | 110 | 105 | 105 | 115 | 100 | 85 | 100 | 85 | 85 | 105 | 105 |

I claim:

1. A tire and rim assembly comprising a radial tire for heavy duty use and a regular rim adapted to receive said tire, said tire comprising a carcass having at least one ply of radially arranged cords, a tread on the carcass provided on the outer face thereof with a curvature, and a belt disposed between the carcass and the tread and having at least two plies of parallel cords inclined with respect to the circumferential direction of the tire, the carcass provided with a profile comprising an upper region provided with an outwardly swelling curvature at least 90% of which is formed by a circular arc having a radius (R1), and a lower region provided with an outwardly swelling curvature at least 90% of which is formed by a circular arc having a radius (R2) where the upper region extends between a maximum carcass section width point (b) corresponding to the maximum tire section width point (f) and a belt outer edge point (a) defined as an intersection of the carcass with a line (Ke) extending parallel to the tire equator from a edge (e) of the belt ply which is narrowest within three plies from the innermost ply, and the lower region extends between the maximum carcass section width point (b) and an inflection point (c) at a height H2 of 160% of the height H1 of a flange of said rim, each from the bead base line, the ratio (R1/R1(5)) of the radius (R1) of the upper region when the tire is mounted on the rim and inflated to a normal pressure to the radius (R1(5)) of the upper region when the tire is mounted on said rim and inflated to 5% of its normal pressure, being not less than 0.70 and not more than 0.95, the ratio (TR1/SW) of the radius (TR1) of the curvature of the tread face to the maximum tire section width (SW) when the tire is mounted on said rim and inflated to the normal pressure, being not less than 1.28 and not more than 1.95, the ratio (R1/R2) of the radius (R1) of the upper region to the radius (R2) of the lower region, when the tire is mounted on the rim and inflated to the normal pressure, being not less than 0.95 and not more than 1.08, and the ration (R1/Hg) of said radius (R1) of the upper region to the radial distance (Hg) between the maximum tire section width point (b) and the center point (g) on the tire equator, when the tire is mounted on the rim and inflated to the normal pressure, being not less than 0.90 and not more than 1.05.

2. The tire and rim assembly according to claim 1, wherein said belt comprises three or four plies of parallel cords inclined with respect to the circumferential direction of the tire.

3. The tire and rim assembly according to claim 2, wherein said belt includes one ply of parallel cords arranged at an angle of 40 to 70 degrees with respect to the circumferential direction of the tire.

4. The tire and rim assembly according to claim 2, wherein said belt includes two plies of cords arranged at an angle of 10 to 25 degrees with respect to the circumferential direction of the tire.

* * * * *